United States Patent [19]

Göransson

[11] 4,429,836
[45] Feb. 7, 1984

[54] APPARATUS FOR DISINTEGRATING AND MIXING FOODSTUFFS

[76] Inventor: Bengt Göransson, Östanberqsv.34, Örebro, Sweden

[21] Appl. No.: 270,522

[22] PCT Filed: Oct. 2, 1980

[86] PCT No.: PCT/SE80/00238
§ 371 Date: Jun. 4, 1981
§ 102(e) Date: Jun. 4, 1981

[87] PCT Pub. No.: WO81/00956
PCT Pub. Date: Apr. 16, 1981

[30] Foreign Application Priority Data
Oct. 4, 1979 [SE] Sweden .............................. 7908219

[51] Int. Cl.³ .............................................. A47J 43/07
[52] U.S. Cl. .............................. 241/282.1; 241/152 R; 241/292.1
[58] Field of Search ........................ 366/314; 83/356.3; 241/101 B, 101 D, 101.6, 282.1, 282.2, 154, 292.1, 152 R, 29

[56] References Cited

U.S. PATENT DOCUMENTS 3,024,010  3/1962  Sperling ................. 241/282.1 X
3,856,220  12/1974 Waters .................... 241/282.1
3,912,174  10/1975 Karpinski et al. ........ 241/29 X

FOREIGN PATENT DOCUMENTS 2658974  7/1978  Fed. Rep. of Germany ... 241/282.1
685263   9/1979  U.S.S.R. ..................... 241/282.1

Primary Examiner—Mark Rosenbaum
Attorney, Agent, or Firm—Burgess, Ryan & Wayne

[57] ABSTRACT

An apparatus which provides continuous production of sausage mix by permitting the sausage mix to pass through an annular space in which one or more cutting members and one or more mixing members move along the center line of the space, the sausage mix being influenced in such a manner as to move about the center line during its passage through said annular space, so that the mix traverses a helical path.

1 Claim, 6 Drawing Figures 4,429,836

APPARATUS FOR DISINTEGRATING AND MIXING FOODSTUFFS

BACKGROUND OF THE INVENTION

The present invention relates to an apparatus for disintegrating and mixing foodstuffs.

The apparatus to which the invention relates is particularly suitable for, but not limited to, continuously producing sausage mix with maximum homogeneity. Hitherto it has been possible to produce sausage mix with great homogeneity by mixing it in batches. Upon changing over to continuous production, attempts at achieving good homogeneity have so far been unsuccessful.

Sausage mix may contain disintegrated proteins, which are in fact pure meat, lipids consisting of fat, collagen particles, which are not desired but which constitute muscle particles, potato starch, grains and other products, as well as liquids. In known methods of continuous production particles of the various consituents have been obtained in the sausage mix, which is not desired.

SUMMARY

The object of the present invention is to continuously manufacture sausage-meat with the greatest possible homogeneity. This is achieved by means of an apparatus comprising an annular space, in which the ingredients of the sausage mix are permitted to follow the circumference of the annular space, the sausage mix performing a helical movement so that it is mixed. The helical movement of the sausage mix is achieved by means of cutting members and mixing members which disintegrate the ingredients in the mixture which need to be cut up, and also effect the movement of the mixture. Both the cutting members and the mixing members move along the center line of the annular space.

In order to increase the homogeneity of the sausage mixture, a number of annular spaces with cutting and mixing members may be arranged one after the other and connected in series; and the cutting and mixing members in the various annular spaces may rotate at different speeds.

It is advisable for the cutting and mixing members to be blade-like, the inner part of each blade constituting a cutting member and the outer part constituting a mixing member. The inner part of each blade may be designed to force the sausage mix downward and the outer part of the blade may be designed to force the sausage mix upward.

Each annular space may be provided with one or more extra inlet openings to permit the addition of extra ingredients.

It is advisable for each annular space to be defined by two identical halves which are fitted together. The use of two halves facilitates cleaning and also enables them to be moved in relation to each other in order to facilitate feeding of the sausage mix.

IN THE DRAWINGS

The present invention will be described more fully with reference to the accompanying drawings in which.

FIG. 1 is a partly schematic perspective view of the apparatus according to a preferred embodiment of the present invention, FIG. 2 is a vertical cross-section through a supply container in a work situation in said arrangement, FIG. 3 shows a part of the supply container according to FIG. 2 in a different work situation, FIG. 4 shows a cutting and mixing apparatus according to the present invention, FIG. 5 shows a second embodiment of the apparatus according to FIG. 4, and FIG. 6 shows a view of the apparatus according to FIGS. 4 and 5, clarifying the arrangement of a deflection path.

DETAILED DESCRIPTION

Figure 1:
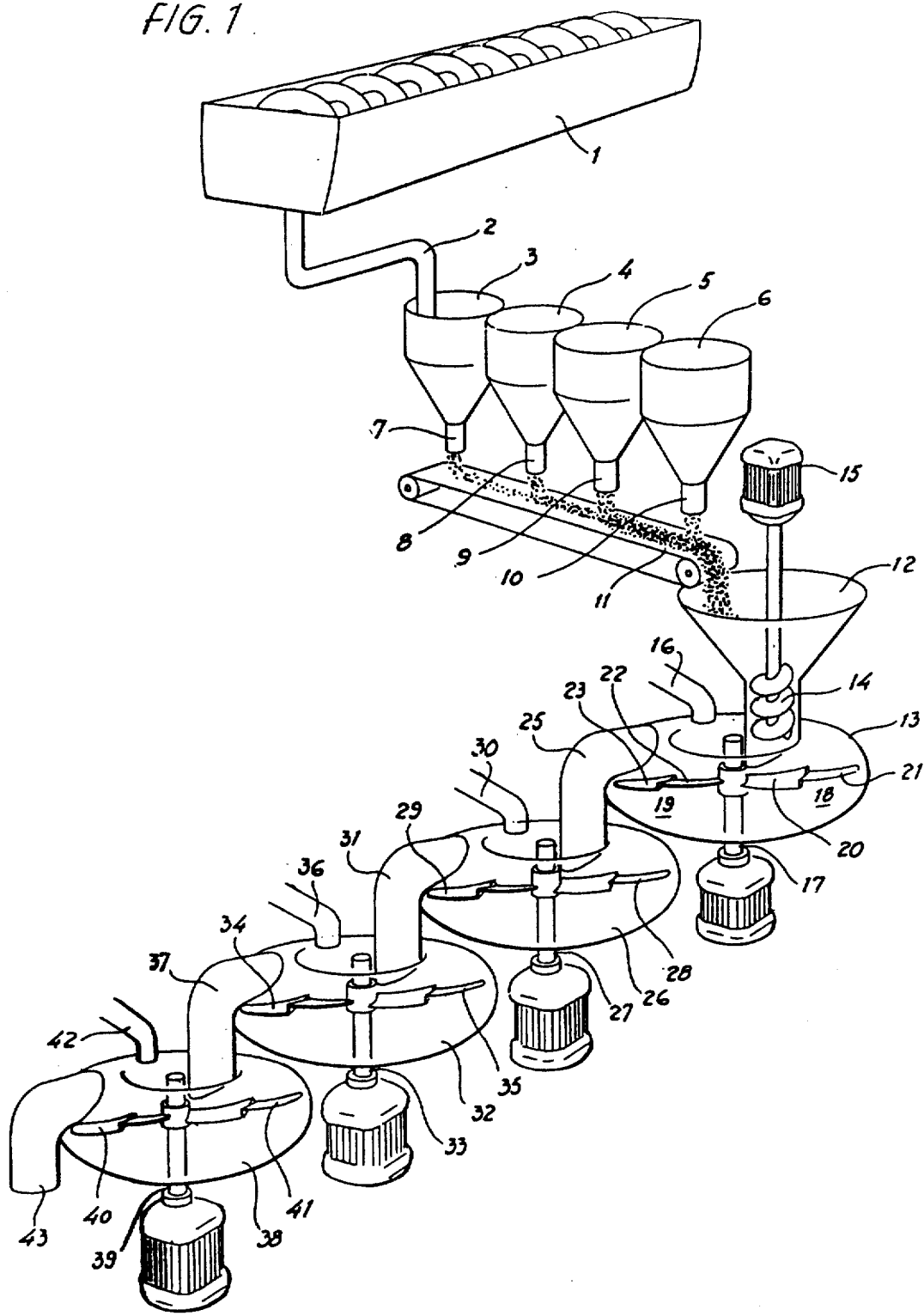

FIG. 1 shows a mixing vessel 1 in which pieces of meat are placed, having a width or diameter of about 3 cm. The pieces of meat are mixed well, and water is added in order to release a different type of protein from those of the first type which remain in the pieces of meat. Salts such as cooking salt are also added in order to release a third type of protein. The mixture thus contains three types of protein. The mixture is pumped via pipe 2 to a supply container 3.

Besides the supply container 3, there are also three other supply containers 4, 5 and 6. The supply containers are provided at the bottom with outlet nozzles 7, 8, 9 and 10. The four outlet nozzles open onto a conveyor belt 11 which can convey the foodstuffs received from a supply container to a feeding funnel 12, which is in communication with a first annular processing space 13 via the inlet 47 (FIG. 4) the space 13.

The funnel 12 contains a feed screw 14 driven by a motor 15 in order to facilitate feeding in of the foodstuffs supplied to the funnel. The annular processing space 13 is also provided with an extra inlet 16. In the centre of the ring formed by the annular space is a motor-driven drive shaft 17. Two blades 18 and 19 extend from the shaft into the annular processing space 13. The blade 18 has an inner part 20 and an outer part 21. The inner part 20 is provided with a cutting edge along one radial edge. The inner part 20 is also shaped so that it presses the foodstuffs downwards as well as having a cutting capacity. The outer part is shaped to exert an upward pressure on the material supplied.

The parts 22 and 23 are identical to the parts 20 and 21 and have the same properties as these. The annular processing space 13 is provided with an outlet pipe 25 leading to a second annular processing space 26 with a motor-driven shaft 27 driving two blades 28 and 29 of the same type as in the annular processing space 13. The annular processing space 26 has an extra inlet pipe 30 and an outlet pipe 31 in communication with a third annular processing space 32 with motor-driven shaft 33 and two blades 34 and 35 of the same type as in the first annular processing spaces.

The annular processing space 32 is provided with an extra inlet pipe 36 and an outlet pipe 37, which is in communication with a fourth annular processing space 38 having a motor-driven shaft 39 driving two blades 40 and 41. The annular processing space 38 is provided with an extra inlet pipe 42 and an outlet pipe 43.

Figure 4:
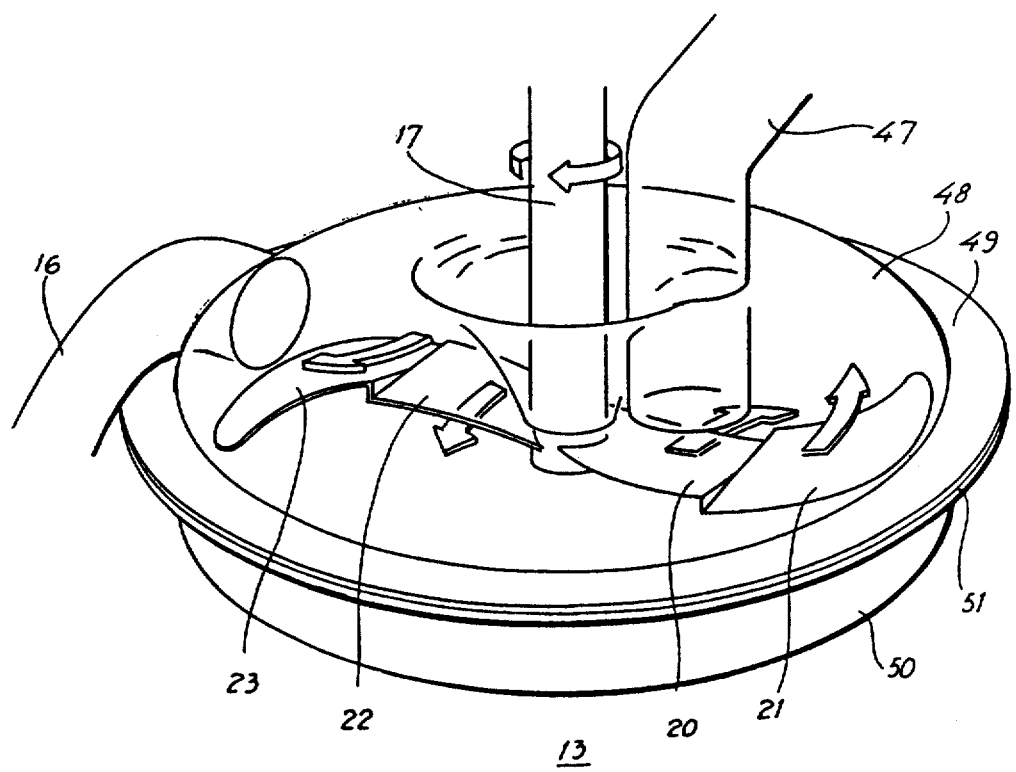

FIG. 4 shows more clearly how an annular processing space is constructed. The space is defined by two halves 48 and 50 which are placed one on top of the other and secured together by means of flanges 49 and 51. Screw joints may suitably be arranged through the flanges. As mentioned earlier, a shaft 17 is arranged in the center of the ring thus formed. Two blades are attached to the shaft. Both blades consist of two parts, an inner part and an outer part. Each inner part 20 and 22 has a cutting edge at its front edge and is also shaped to press down the material supplied, whereas the outer parts 21 and 23 press the material supplied in an upward direction.

Figure 6:
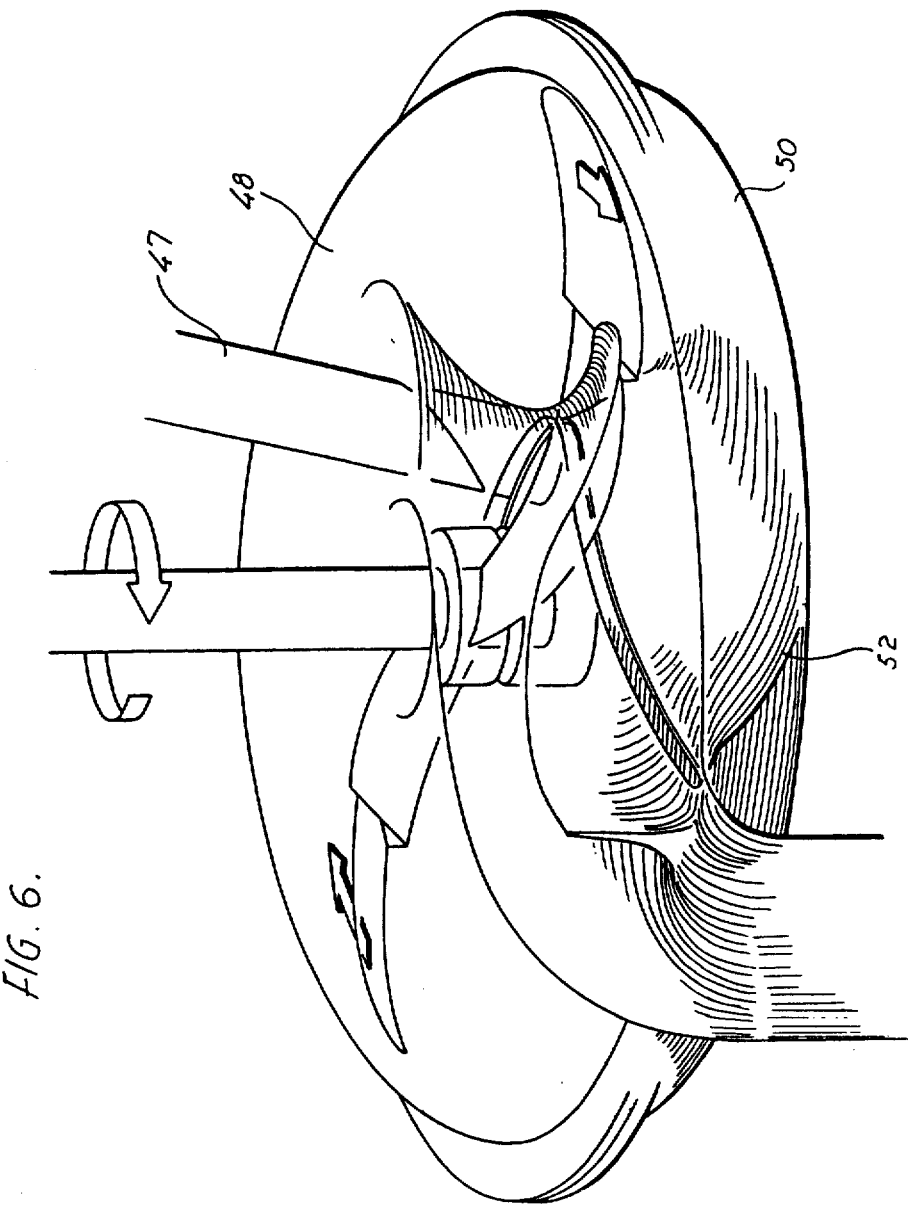

An outlet pipe 25 is placed to the right of the inlet pipe 47. A deflection edge 52 is arranged in front of the outlet pipe, as shown in FIG. 6.

Figure 5:
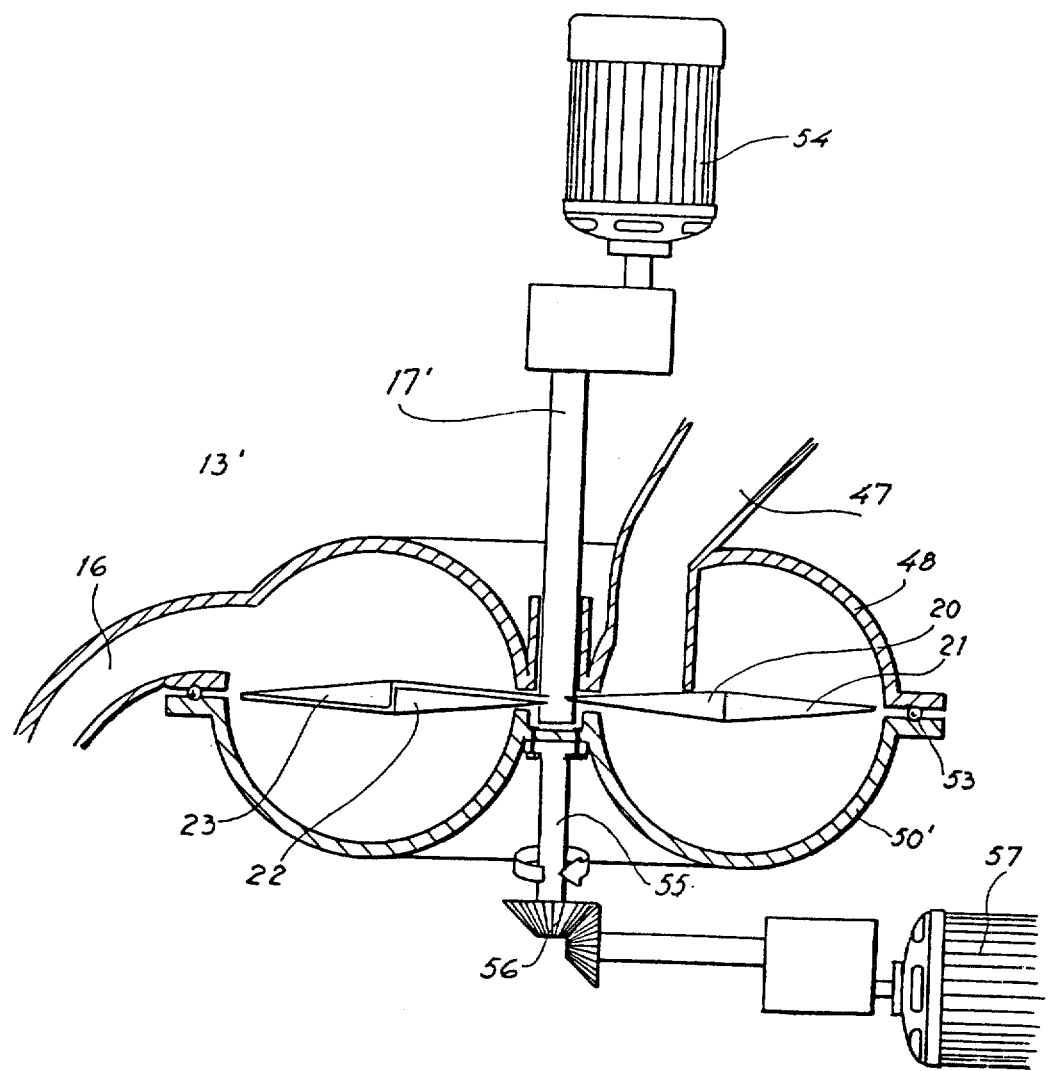

FIG. 5 shows an annular space in accordance with FIG. 4 in which the two annular halves are arranged in such a way as to be movable in relation to each other. Thus in FIG. 5 there is a shaft 17' driven by a motor 54, which causes the two blades 22, 23 and 20, 21 to rotate. The lower half 50' of the annular space 13' is movable in relation to the upper half 48 and is journalled with the help of ball-bearings 53. The lower ring half is secured to a shaft 55 which is rotated by a motor 57 via a transmission 56.

Figure 2:
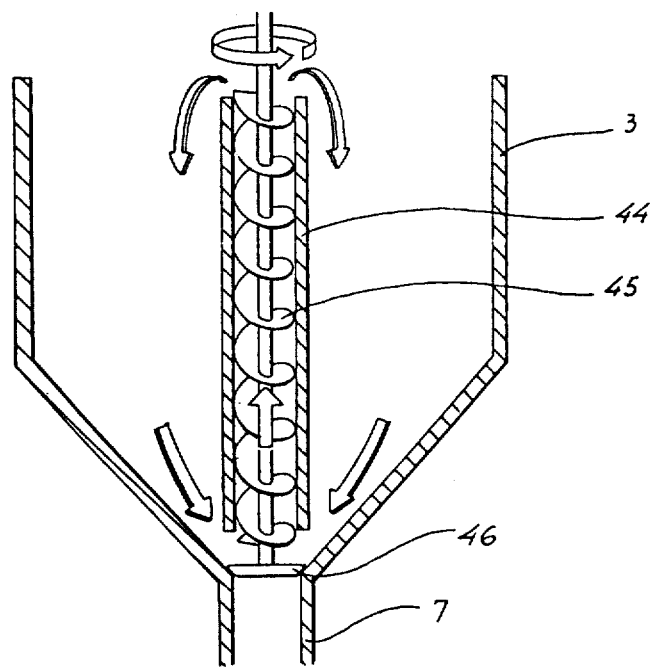
Figure 3:
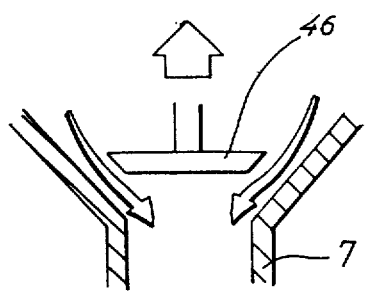

FIG. 2 shows one of the supply containers 3, 4, 5 and 6. The container is provided with a central tube 44 containing a feed screw 45. At the lower end of the axis of the feed screw 45 is a sealing disc 46 which is able to close the outlet pipe 47. The sealing disc 46 is shown in open position in FIG. 3.

The arrangement described above functions in the following manner.

The mixing vessel 1 is supplied with pieces of meat having a width or diameter of about 3 cm. The meat contains three types of protein. Two of these types are separated out by the addition of water and salts. The salts may consist of cooking salt. A mixture of three types of proteins is thus obtained in the vessel. The mixture is pumped through the pipe 2 to the supply container 3.

The working position of the supply container is as shown in FIG. 2, i.e. the sealing disc 46 is in closed position. When the feed screw 45 is rotated the mixture supplied to the supply container will be subjected to further mixing. The mixture is passed up through the central pipe 44 by the feed screw. The mixture moves in the direction indicated by the arrows. If the sealing disc 46 is lifted, the mixture will pass through the outlet pipe 7 to the conveyor belt 11.

The other three supply containers 4, 5 and 6 may be constructed in exactly the same manner as the supply container 3 and may contain other ingredients required for the production of food, in this case sausage. One container may thus contain potato-starch in the form of a viscous or non-viscous compound. The remaining two containers may contain other ingredients for the production of sausage.

Material supplied to the conveyor belt 11 is conveyed to a funnel 12 which, assisted by the feed screw 14, passes it via the inlet 47 to the inside of the annular space 13. The material supplied is chopped up by the blade parts 20 and 22 while at the same time being pressed down by these parts. The blade parts 21 and 23 press the material upwards. The material will move about one revolution in the clockwise direction until it reaches the deflection wall 52, where it will be pressed out through the outlet pipe 25.

Due to the different shaping of the blade parts 20 and 22 in relation to the blade parts 21 and 23, the material in the annular space 13 will perform a helical movement about the center line of the space, thus resulting in thorough mixing. The mixing and also the degree of disintegration are further improved by the addition of another three annular processing spaces 26, 32 and 38.

The blades in the various processing spaces may have different speeds of rotation. A suitable speed of rotation for the first annular space is 0.5 revolutions per minute (R.P.M.), for the second 0.75 r.p.m., for the third 1.0 r.p.m. and for the fourth 1.5 r.p.m. The idea is that 1.0 r.p.m. should correspond to 3000 r.p.m., but of course other speeds are possible.

If the lower half 50' of the annular space is to be moved in relation to the upper half 48, a suitable speed is 1 to 10 revolutions per minute.

Thus, in accordance with the present arrangement pieces of meat are subjected to repeated disintegration and repeated mixing. This ensures good homogeneity.

It should be evident that the arrangement can also be used for other types of foodstuff than those used for making sausages, in which an ingredient requires disintegration by means of a chopping process.

It has been mentioned above that each blade has an inner and an outer part, both parts being shaped to assist in the mixing process. It has also been mentioned that only the inner part has a cutting edge. However, it should be evident that the outer part may also be provided with a cutting edge.

Furthermore, each supply container may be shaped so that the sealing disc 46 closes the pipe 7 outside its orifice. In this alternative construction the feed screw 45 may extend into the pipe 7 so that if the screw is rotated in one direction the sausage mix is fed downwardly in the pipe 44 and if it is rotated in the opposite direction the sausage mix is fed upwardly in the pipe 44.

One of the annular processing spaces, preferably the last one 38, may be provided with instruments for measuring the water content, fat content and temperature of the sausage mix.

One or more of the annular processing spaces may be connected to a vacuum system to remove air bubbles from the sausage mix.

What is claimed is:

1. Apparatus for providing continuous cutting and mixing of foodstuff such as sausage, comprising:

a generally cylindrical vessel having an axially disposed rotatable shaft and an annular processing space surrounding said shaft, said vessel having two annular halves rotatable with respect to each other about the axis of said shaft;

a foodstuff inlet adjacent a radially inner part of said annular processing space and a foodstuff outlet adjacent a radially outer part of said annular processing space; and a pair of mixing and cutting blades extending in opposite directions radially out from said shaft for rotation therewith, each blade having a radially inner portion and a radially outer portion, the inner portion of each blade being pitched to urge the foodstuff in one axial direction while cutting it, the outer portion of each blade being pitched to urge the foodstuff in the opposite axial direction.

* * * * *